(12) United States Patent
Ferguson

(10) Patent No.: US 6,409,011 B1
(45) Date of Patent: Jun. 25, 2002

(54) GATE CONVEYOR

(75) Inventor: Gregory A. Ferguson, New Bedford, MA (US)

(73) Assignee: Precision Handling Devices, Inc., Fall River, MA (US)

( * ) Notice: Subject to any disclaimer, the term of this patent is extended or adjusted under 35 U.S.C. 154(b) by 0 days.

(21) Appl. No.: 09/577,093

(22) Filed: May 24, 2000

(51) Int. Cl.[7] ............................................... B65G 21/14
(52) U.S. Cl. ...................................... 198/861.3; 186/68
(58) Field of Search ........................... 198/861.2, 861.3, 198/632; 186/68

(56) References Cited

U.S. PATENT DOCUMENTS

| | | | | |
|---|---|---|---|---|
| 3,134,480 A | * | 5/1964 | Loosli ........................ | 198/861.3 |
| 3,511,358 A | * | 5/1970 | Peterson ..................... | 198/632 |
| 3,841,464 A | * | 10/1974 | Tome ........................ | 198/861.2 |
| 3,889,796 A | * | 6/1975 | Baily et al. ........... | 198/861.2 X |
| 4,061,205 A | * | 12/1977 | Musser ...................... | 186/86 X |
| 4,753,337 A | | 6/1988 | Grosjean .................... | 198/583 |
| 4,775,047 A | * | 10/1988 | Grall ........................ | 198/861.2 |
| 5,086,911 A | | 2/1992 | Douglas ..................... | 198/632 |
| 5,090,550 A | * | 2/1992 | Axmann .............. | 198/861.3 X |
| 5,172,804 A | | 12/1992 | Chersin .................... | 198/861.5 |
| 5,443,351 A | | 8/1995 | Pettijohn ................... | 414/523 |
| 5,538,391 A | | 7/1996 | Bonnet ..................... | 414/796.5 |
| 5,568,857 A | | 10/1996 | Chen et al. ................. | 198/592 |
| 5,655,647 A | | 8/1997 | Wheeler ................... | 198/861.5 |
| 5,662,210 A | * | 9/1997 | Toews ........................ | 198/632 |
| 5,873,449 A | | 2/1999 | Davenport ............. | 198/370.09 |
| 5,875,883 A | * | 3/1999 | Ertel et al. ........... | 198/861.2 X |

\* cited by examiner

Primary Examiner—Joseph D. Pape
Assistant Examiner—Patricia Engle
(74) Attorney, Agent, or Firm—Kenneth J. Lukacher; Martin Lukacher

(57) ABSTRACT

A conveyor has an endless belt which encompasses a gate section and a fixed section thereof Both the gate section and fixed section have beds which extend lengthwise and widthwise thereof between rails which extend along the lengths of the section. The edges of the belt run along the rails and are hence guarded by the rails. The sections are joined at adjacent edges by hinges pivotally connected to the bed of the fixed section and extending across the joint to the gate section. The hinges are within the confines of the belt, that is within the path of the belt and between the edges of the belt, so as to enable the gate section to be pivoted to an open position allowing a passageway via the width of the conveyor. When in closed position, the hinge enables the ends of the rails to move into abutting relationship. Permanent guards on the outsides of the fixed section can extend above the belt to maintain safe operating conditions without interfering with the opening and closing of the gate section. The endless belt may be made of panels joined together by rods which allow the belt to turn around the outer ends of the fixed and gate sections. The fixed section is equipped with a sprocket in which the rods are engaged for driving the belt. The sprocket is motorized by a drive within a closed housing attached to the rails so that the fixed section serves as a drive section of the conveyor. The belt is not tensioned and is supported on the bed of the sections so that the belt can move and change shape from straight to curved at the hinged joint as the gate section moves from closed to open position. The sections may be mounted on legs. The gate section may be counterbalanced to maintain it in open position. Concealed interlock sensors may be located in the joint for automatically stopping and starting the conveyor when opened and closed, respectively.

8 Claims, 4 Drawing Sheets

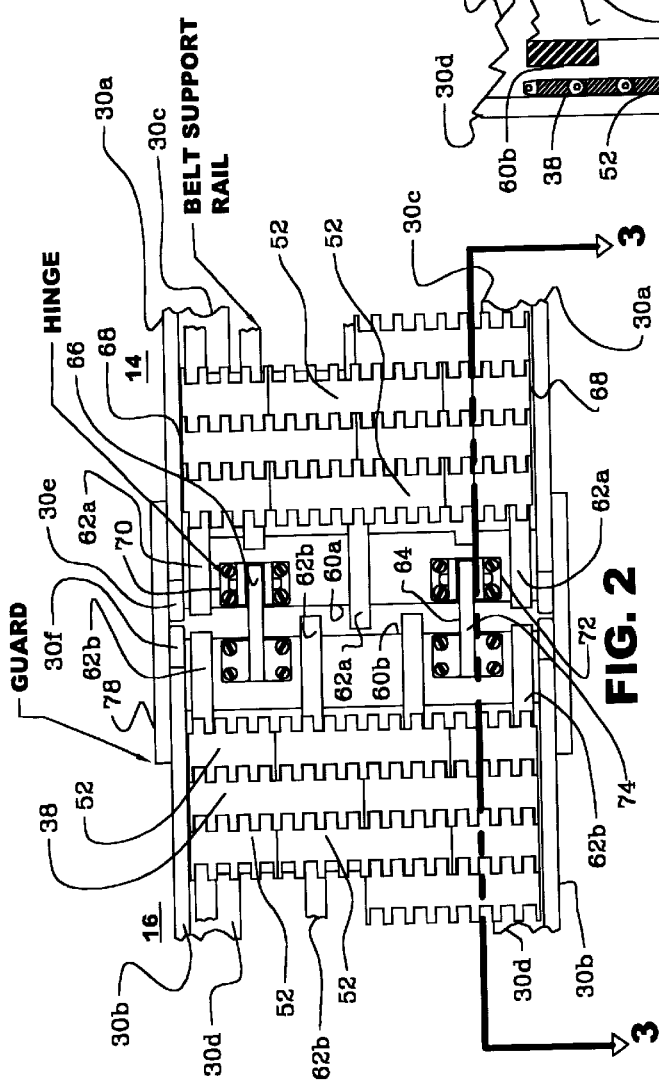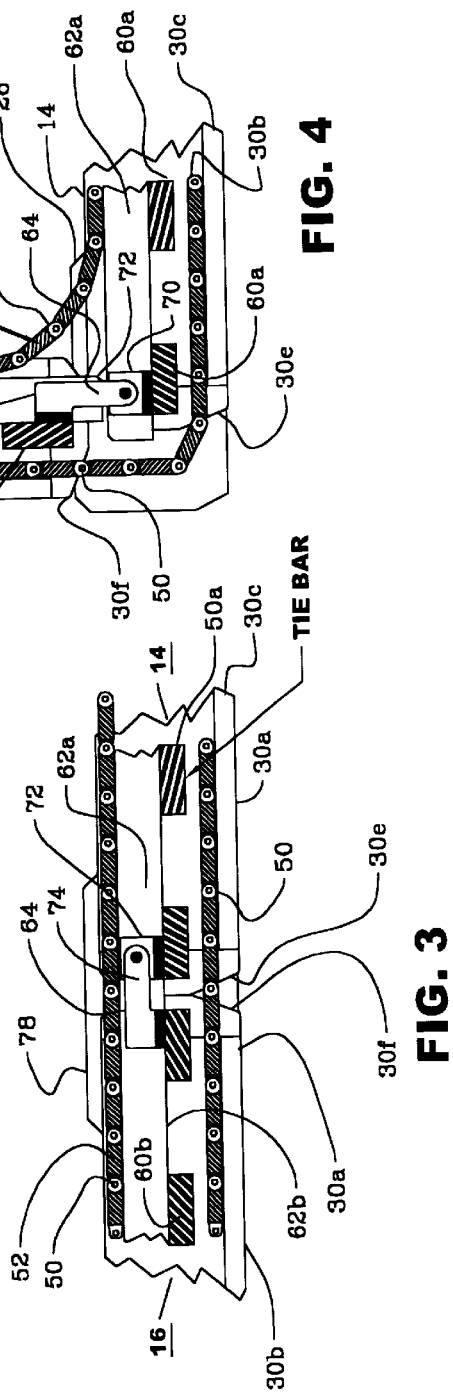

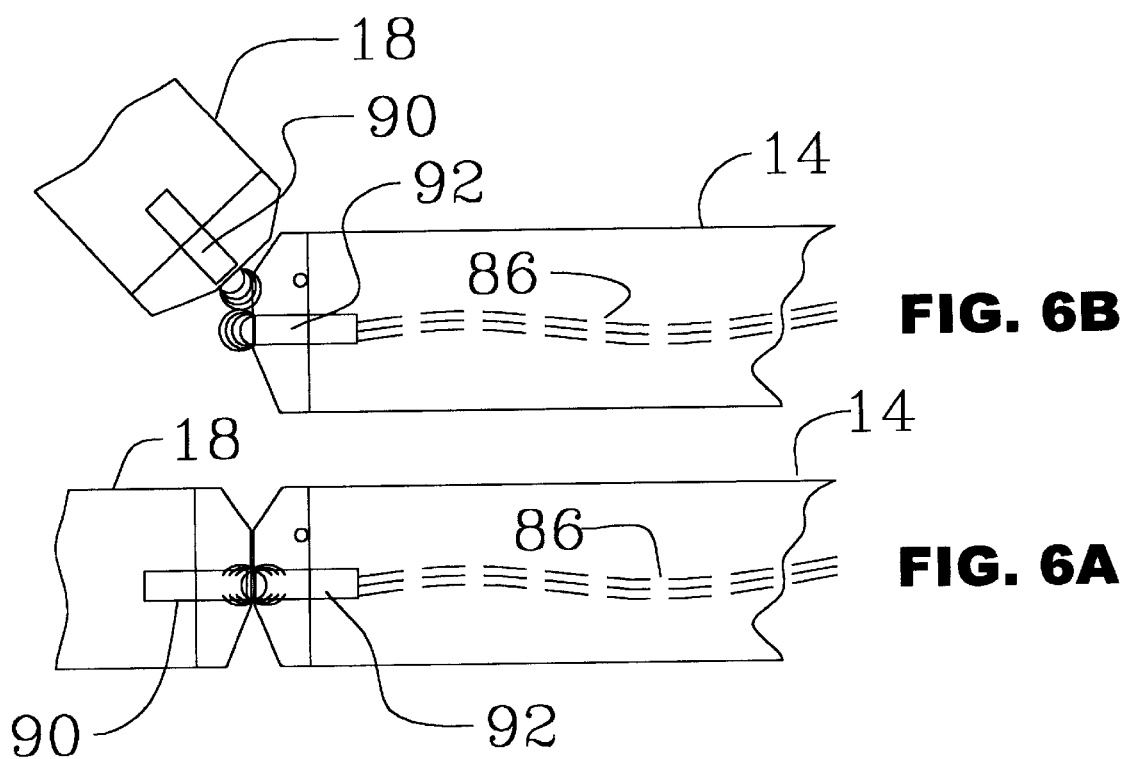

GATE CONVEYOR

The present invention relates to powered conveyors and particularly to powered gate conveyors which incorporate a gate system providing a passageway when the gate is opened to enable workers to enter and leave their work area via the powered gate.

The invention provides endless or continuous belt conveyors with pivotal gate sections, but which are substantially the same in form factor as conveyors without such sections, thereby removing restrictions on and increasing the flexibility of use and layout of such conveyors. Gate conveyors provided by the invention are implemented with a single endless belt, which need not be under tension, and is driven in the fixed section of the conveyor. Potentially unsafe conveyor operating conditions are avoided by utilizing pivot hinges located within the confines of the loop of the belt and between the edges thereof so that the joint can readily be guarded and dangerous gaps between the sections are not created when the these sections are closed and the conveyor is in operation.

Continuous conveyors arc in common use. They may be purchased in various sizes and disposed in various arrangements to provide pathways. These pathways may enclose areas in which workers are trapped. In addition, joining conveyors to workbenches may be desirable which restricts the form factor of the conveyor system. Conveyor arrangements that provide an efficient flow of work to enable assembly of product in many areas of a factory floor without trapping workers is facilitated by the gated conveyor provided by the invention.

It has been proposed to provide conveyors with sections that are pivotable or laterally movable to enable arrangements of conveyors which achieve the desired flow of the work without trapping workers. Conveyors with laterally movable gate sections are, for example, shown in Davenport, U.S. Pat. No. 5,873,449, issued Feb. 23, 1999 and a pivotable conveyor section which provides a pass through gate is described in Wheeler, U.S. Pat. No. 5,655, 647 issued Aug. 12, 1997. It has also been proposed to provide ladders and platforms which allow workers to enter and leave an area trapped by conveyors.

Pivotable power gates conventionally use separate belts for the gate section and the fixed section thereof A motor drives the belt of the fixed section and another mechanism transfers the power from the drive or fixed section to the belt of the gate section. There is typically a gap between the two continuous belts which is called a "pinch point". Such pinch points are undesirable because of safety considerations. The transfer mechanism is located outside of the width of the belts, and must be shielded and guarded so as to avoid injury to workers. The form factor of the conveyor is altered to provide room for the transfer mechanism and guards. The pivotal mounting of the gate section is included in the transfer mechanism, engendering the need for bearings and housings which increase conveyor cost. The separate belt of the gate section may be much shorter than the belt in the drive section, which increases difficulties with alignment and set-up for tracking and synchronism of the belts of these sections.

Accordingly, it is the principal object of the present invention to provide an improved conveyor system having a pivotal powered gate section.

A more specific object of the invention is to provide an improved conveyor with a powered gate pivoted on a fixed or drive section of the conveyor which utilizes a single continuous, endless or loop belt, encompassing both conveyors, thereby eliminating the need for transfer mechanisms and avoiding changes in the form factor of the gated conveyor from conventional non-gated conveyors.

It is a still more specific object of the present invention to provide an improved powered gate conveyor system with a gate section which moves into abutment with the fixed or drive section when the gate is closed thereby avoiding pinch points.

It is a still further object of the present invention to provide an improved powered gate conveyor where the gate is counterbalanced and inter-locked with the motor drive, so as to facilitate the safe operation of the conveyor.

It will be understood that the invention may be provided in a manner to effectuate one or more, but not necessary, all of the foregoing objects and features of the invention.

Briefly described, a powered gate conveyor embodying the invention has a fixed section and a gate section. The sections have adjacent ends which are pivotally connected to form a joint within the confines of an endless belt which extends around both of the sections. The belt may be disposed in non-tensioned condition, supported on beds within rails which extend along the outsides of the sections. The gate section is pivoted upwardly to an open position where it may be maintained by a counterbalancing mechanism, and when open, provides a passageway across the width of the conveyor via the gate section. In the closed position, the rails move into abutment avoiding a gap or pinch point between the gate and fixed sections. Interlocks may be provided in the joint region of the conveyor for controlling motivation thereof by a drive associated with the fixed section.

The foregoing and other objects, features and advantages of the invention will become more apparent from a reading of the following description in connection with the accompanying drawings in which:

FIG. 2 is a fragmentary plan view of the conveyor shown in FIG. 1 where parts of the upper and lower reach of the endless belt are removed to illustrate the structure of the joint between the gate and fixed or drive sections of the conveyor;

FIG. 3 is a sectional view of the portion of the conveyor shown in FIG. 2, taken along the line 3—3 in the direction of the arrows;

FIG. 4 is a view similar to FIG. 3 but with the gate section in open position;

Figure 5B:
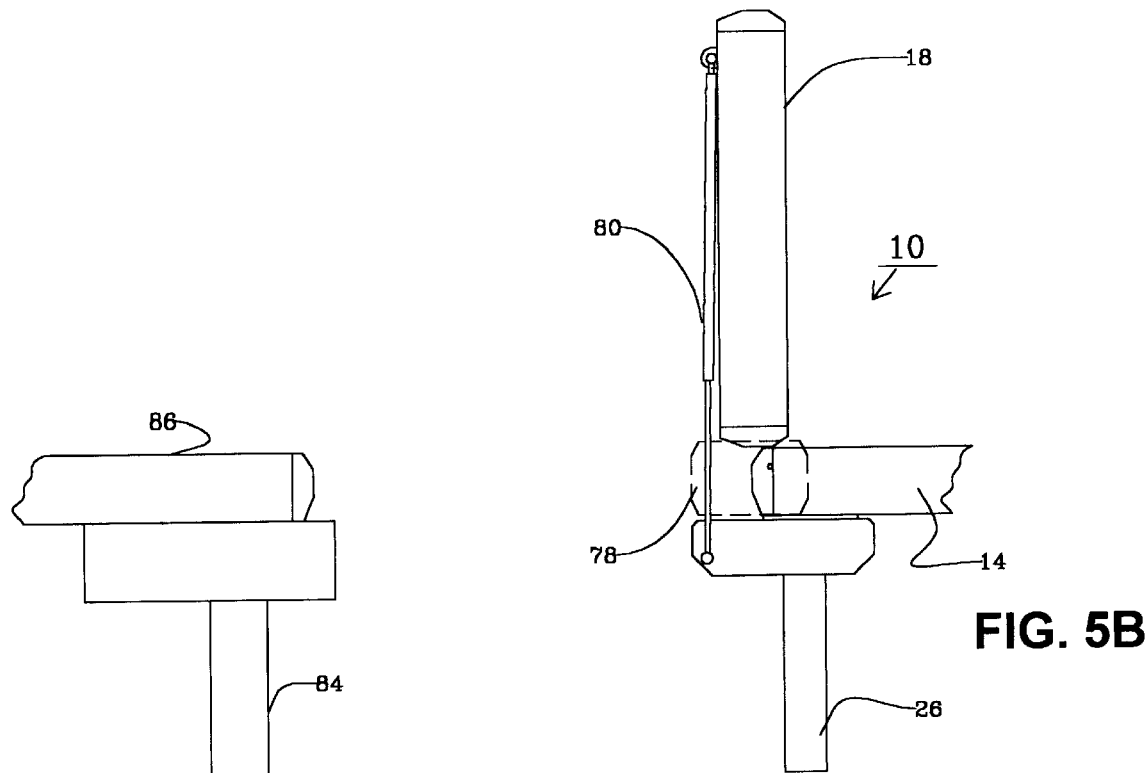
Figure 5A:
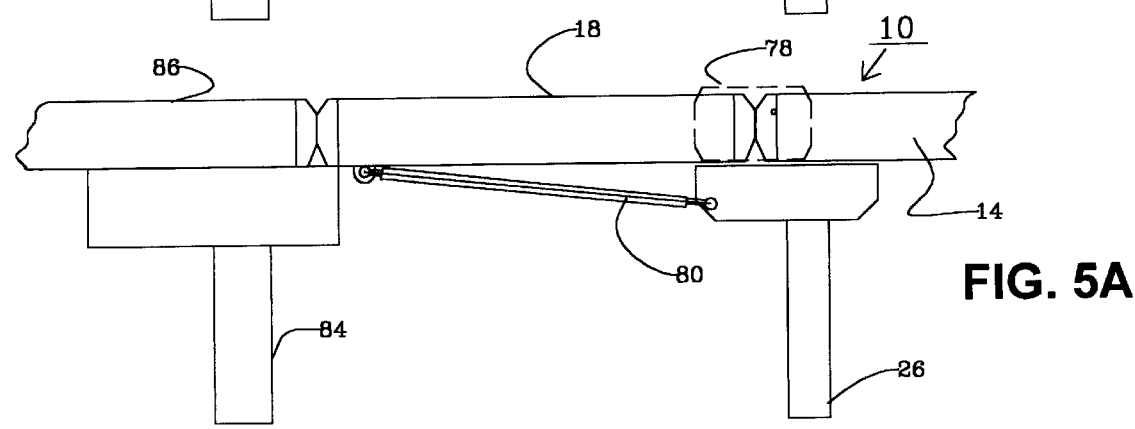

FIGS. 5A and 5B are elevational views of a gate conveyor embodying the invention adjacent to another conveyor with the gate section closed and open, respectively; and FIGS. 6A and 6B are schematic elevational views of the portion of the gate and fixed sections of the conveyor in closed and open position showing a sensor switch which may be used as an interlock to prevent motivation of the conveyor when the gate is open.

Figure 1:
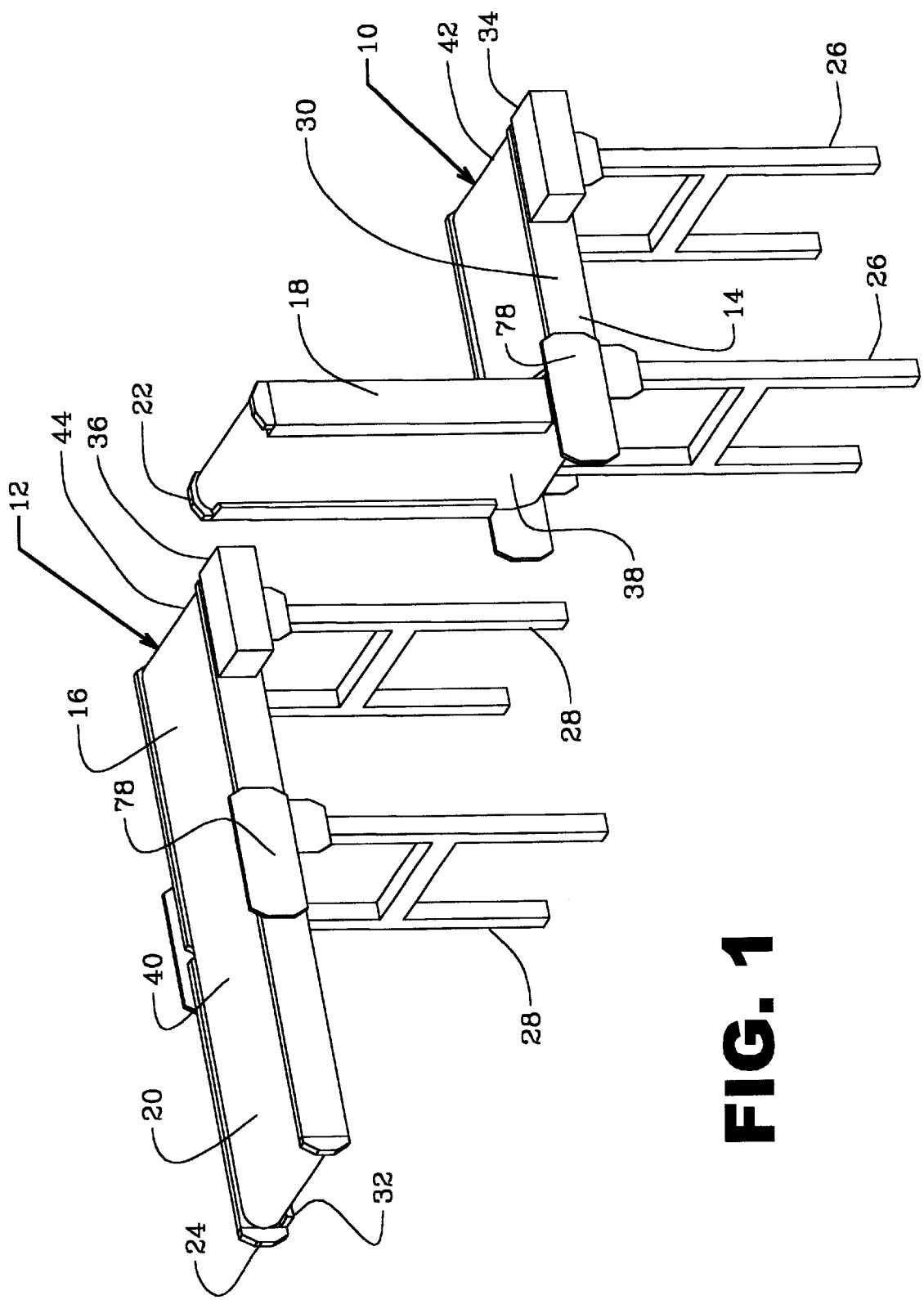
FIG. 1 is a perspective view of two power gate conveyors in accordance with the invention, one with the gate section thereof in open position and the other with the gate section in closed position.

Referring to FIG. 1, there are shown gate conveyors 10 and 12. Both have fixed or drive sections 14 and 16 and gate sections 18 and 20. The gate section 18 is vertical, 90 degrees to the drive section 14, which is the open position thereof The gate section 20 is horizontal and in alignment with the drive section 16. Legs not shown may be provided which extend from the outer ends 22 and 24 of the gate sections 18 and 20 or these outer ends may rest on supports as shown in FIGS. 5A and 5B. Support legs 26 and 28 extend, from side rails 30 of the fixed section 14 and from side rails 32 of the fixed section 16, downwardly and rest on the floor. Housings 34 and 36 containing motor drives are attached to the rails 30 and 32 of the fixed or drive sections 14 and 16. Endless belts 38 and 40 loop around the outer ends 22 and 24 of the gate section, where idler wheels are journaled to the rails 30 and 32. The other ends 42 and 44 of the conveyors 10 and 12 turn around drive wheels which are connected to motor drives (gear boxes for motors) in the housings 34 and 36. These wheels are sprockets which engage lugs provided by rod links 50 which tie together inter-digited plates 52, which constitute the belts 38 and 40 (see FIGS. 2, 3, and 4).

Between the rails 30a and 30b (see FIGS. 2, 3, and 4, where the rails 30 are designated 30a, 30b, and parts thereof by 30c, d, e, and f), beds provided by tie bars, 60a in the fixed section, and 60b in the gate, and by interior belt support rails 62a and 62b in the fixed and gate sections, respectively. The rails and beds constitute the frames of the conveyor sections. The rails are generally L shaped (see 32 in FIG. 1) and have flanges 30c and 30d to which the support legs 26 or 28 may be attached. The rails also have interior ends 30e and 30f, with noses which may be of elastic (plastic or rubber) material, which provide bumpers.

The joint or pivotable (rotatable) connection between the fixed section 14 and the gate section 16, is implemented by two hinges 64 and 66 disposed within the confines (the loop) of the endless belt 38 and between the edges 68 of the belt. The hinges are pivotally mounted on hinge journals 70 and 72 attached to the tie bar 60a adjacent the adjoining ends of the sections 14 and 16. The hinge arms are generally L shaped and have legs 74 which are attached to the tie bar 60b of the gate section adjacent to the joint. The legs 74 may have flanges which are screwed to the tie bars 60b. Similarly the journals 70 and 72 for the arms, through which pivot rods extend, may be flanged and screwed to the tie bars 60a of the fixed section 14.

When the gate section is closed, as shown in FIG. 3, the inner ends of the sections at the bumpers 30e and 30f of the rails 30a and 30b are in contact and abut each other. There is no pinch point at the joint of the sections in the closed position thereof. Interior belt support rails 62a and 62b of the sections 14 and 16 are offset from each other between the hinges 64 and 66 to allow their lengths to overlap and provide support at the joint between the sections 14 and 16.

The rails 30a and 30b provide guards for the edges 68 of the belt 38. Guards at the joint are provided by guard plates 78, which are attached to the outside of the rails 30, and extend beyond the joint, so as to provide full protection during the open and closed position (see especially FIGS. 3 and 4).

As shown in FIGS. 5A and 5B an over center mechanism provided by a pneumatic spring 80 connected between the flange of the rails 18 and the support leg 26, may be used to maintain the gate in open position, or to provide a power lift for the gate if manual lifting is not desired. A pair of such gas springs may be provided on each rail 30. The gate, when closed, may rest on a support 84 of an adjacent conveyor 86.

As shown in FIGS. 6A and 6B a reed switch is mounted in the frame of the conveyor at the joint. A magnet 90 is mounted in the gate section, opposite to the reed switch 92. The magnet 90 and switch 92 are separated during gate opening. The switch, which is connected to the motor drive by wiring 86, then opens causing the motor of the drive to stop when the gate is opened and enabling the motor to be energized when the gate is closed.

Variations and modifications in the herein described gate conveyor, within the scope of the invention, will undoubtedly suggest themselves to those skilled in the art. Accordingly, the foregoing description should be taken as illustrative and not in a limiting sense.

What claimed is:

1. A conveyor having a fixed section and gate section which defines the width and length of said conveyor, said sections having adjacent ends in end to end relationship, a conveyor belt supported and extending around said sections to define an endless loop, said gate section being rotatably connected to said fixed section at said adjacent ends for movement between an open position, providing a clear passageway across the width of said conveyor via said gate section, and a closed position, and wherein a joint provides the rotatable connection between said sections, said joint being entirely within the confines of said loop.

2. A conveyor having a fixed section and gate section which defines the width and length of said conveyor, said sections having adjacent ends in end to end relationship, a conveyor belt supported and extending around said sections to define an endless loop, said gate section being rotatably connected to said fixed section at said adjacent ends for movement between an open position, providing a clear passageway across the width of said conveyor via said gate section, and a closed position, and wherein said sections have members defining a bed along which said belt extends, and a hinge enabling rotation of said gate section, said hinge being connected to said bed between the edges of said belt and extending between said adjacent ends of said section.

3. The conveyor according to claim 2 wherein said hinge is connected to the bed of one of said sections.

4. The conveyor according to claim 3 wherein said one of said sections to which said hinge is pivotally connected is said fixed section.

5. The conveyor according to claim 2 wherein said hinge is generally L shaped and has an arm and a leg, said arm having a pin connected to said bed of said of one of said sections in a journal about which said hinge rotates, and said leg being fixedly connected to the bed of the other of said sections.

6. The conveyor according to claim 5 wherein said one section is said fixed section and said other section is said gate section.

7. A conveyor having a fixed section and a gate section said gate section being rotatably mounted on said fixed section for movement from a closed position where said sections are in horizontal alignment to an open position to provide a passage via the width of said conveyor, said fixed and gate sections having bed structures, an endless conveyor belt supported on said bed structures, said belt turning about one of the ends of each of said sections which defines the length of said conveyor, the other of said ends of said bed structures being bridged by said belt when said gate section is in both said open and said closed positions, and further comprising at least one hinge pivotally connected to the bed structure of one of said sections, said hinge extending across said other of said ends of each of said bed structures and fixedly connected to the bed structure of the other of said sections.

8. The conveyor according to claim 7 wherein said at least one hinge couples said bed structures at the other of said ends thereof, and said at least one hinge being disposed within said belt within the width thereof.

* * * * *